(12) United States Patent
Kawafuji et al.

(10) Patent No.: US 9,462,147 B2
(45) Date of Patent: Oct. 4, 2016

(54) IMAGE PROCESSING APPARATUS, IMAGE PROCESSING METHOD, RECORDING APPARATUS, AND NON-TRANSITORY COMPUTER-READABLE STORAGE MEDIUM

(71) Applicant: CANON KABUSHIKI KAISHA, Tokyo (JP)

(72) Inventors: Hiroshi Kawafuji, Kawasaki (JP); Naoko Baba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/679,925

(22) Filed: Apr. 6, 2015

(65) Prior Publication Data

US 2015/0296095 A1   Oct. 15, 2015

(30) Foreign Application Priority Data

Apr. 11, 2014   (JP) .................................. 2014-082126

(51) Int. Cl.
*H04N 1/04*   (2006.01)
*H04N 1/00*   (2006.01)

(52) U.S. Cl.
CPC ............ *H04N 1/00801* (2013.01); *H04N 1/04* (2013.01)

(58) Field of Classification Search
CPC .. G06K 15/107; G06K 15/102; G06K 15/02; G06K 15/105; G06K 15/1898; G06K 2215/101; G06K 15/10; G06K 15/1848; G06K 15/1869; G06K 15/1872; G06K 15/1878; G06K 2215/0082; G06K 2215/0094
USPC ....... 347/14, 9, 15, 12, 11, 43; 358/1.9, 474, 358/1.5, 1.8, 3.06, 3.14, 3.26; 382/299
See application file for complete search history.

(56) References Cited

U.S. PATENT DOCUMENTS

| 5,839,529 | A   | * | 11/1998 | DePaoli ........................ 180/65.1 |
| 6,788,434 | B1  | * | 9/2004  | Kanematsu et al. ........... 358/1.9 |
| 6,874,864 | B1  |   | 4/2005  | Maeda |
| 2008/0158295 | A1 | * | 7/2008 | Suzuki ..................... B41J 2/155 347/42 |
| 2009/0040256 | A1 | * | 2/2009 | Baba et al. .................... 347/14 |
| 2010/0033525 | A1 | * | 2/2010 | Kunihiro ........................ 347/12 |
| 2010/0321434 | A1 | * | 12/2010 | Baba ..................... B41J 29/393 347/12 |
| 2011/0285779 | A1 | * | 11/2011 | Yamada ................ B41J 2/2146 347/15 |
| 2011/0286020 | A1 | * | 11/2011 | Ishikawa et al. ............. 358/1.9 |
| 2011/0316911 | A1 | * | 12/2011 | Ishikawa ............. G06K 15/107 347/9 |
| 2012/0044290 | A1 | * | 2/2012  | Sahara et al. .................. 347/12 |

(Continued)

FOREIGN PATENT DOCUMENTS

JP   2004-167947 A   6/2004

*Primary Examiner* — Negussie Worku
(74) *Attorney, Agent, or Firm* — Canon U.S.A., Inc. IP Division

(57) ABSTRACT

There is provided an image processing apparatus for recording an image on a unit region of a recording medium by performing relative scanning operations, each relative scanning operation being a scanning operation of recording element groups relative to the unit region performed by using a recording head including the recording element groups, each including a different recording element. The image processing apparatus receives image data of an image to be recorded on the unit region, obtains, for each of the recording element groups, a ratio of being used for recoding the image on the unit region, and corrects the image data in accordance with the obtained ratios and recording characteristic information representing recording characteristics of the recording element groups.

16 Claims, 16 Drawing Sheets

(56) References Cited

U.S. PATENT DOCUMENTS

| | | | |
|---|---|---|---|
| 2012/0081443 A1* | 4/2012 | Ono et al. ....................... | 347/15 |
| 2012/0081449 A1* | 4/2012 | Kagawa et al. ................ | 347/19 |
| 2012/0114188 A1* | 5/2012 | Murase ............. H04N 1/00015 | 382/112 |
| 2012/0194595 A1* | 8/2012 | Kawafuji ........... G06K 15/1869 | 347/15 |
| 2013/0044150 A1* | 2/2013 | Kawafuji ................ B41J 29/38 | 347/12 |
| 2015/0097896 A1* | 4/2015 | Kawafuji ............... B41J 2/2135 | 347/37 |
| 2015/0314615 A1* | 11/2015 | Humet ................... B41J 2/2103 | 347/9 |
| 2016/0096363 A1* | 4/2016 | Kawatoko ........... B41J 2/04586 | 347/12 |
| 2016/0129710 A1* | 5/2016 | Kayahara ............... B41J 25/001 | 347/29 |

* cited by examiner

FIG. 1A    FIG. 1B    FIG. 1C
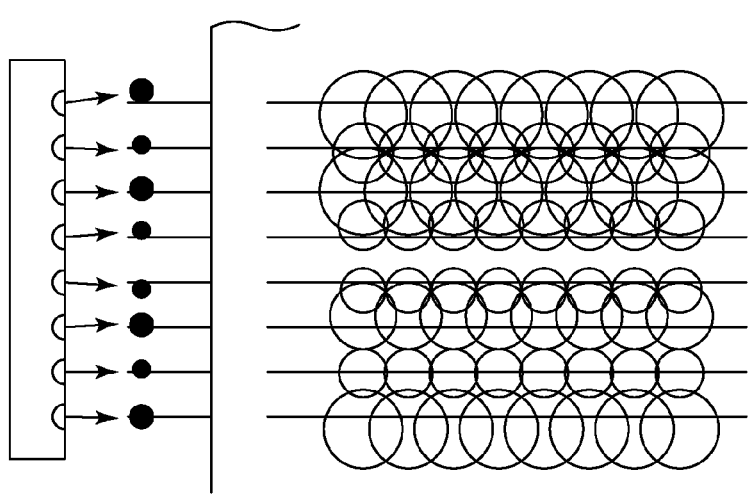 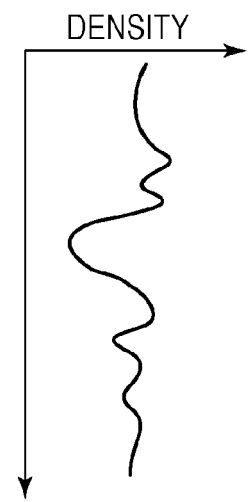

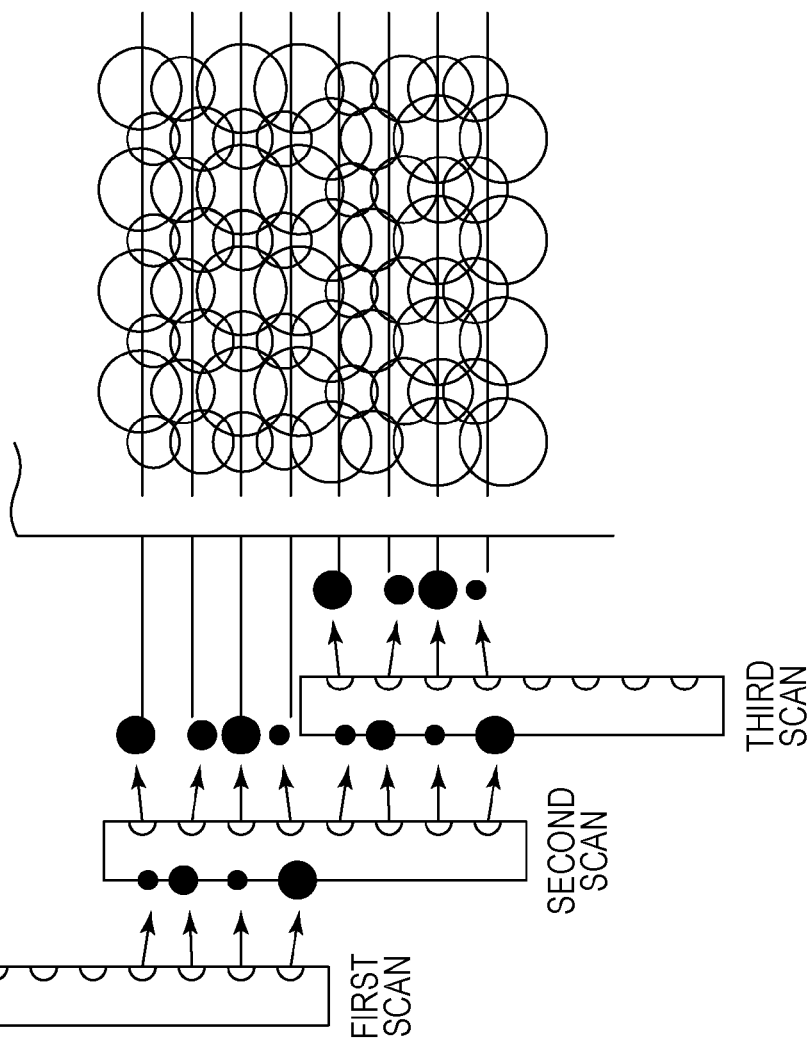

FIG. 15A 41C  144

| | |
|---|---|
| ○ | 110% |
| ○ | 105% |
| ○ | 100% |
| ○ | 95% |
| ○ | 90% |
| ○ | 90% |
| ○ | 95% |
| ○ | 100% |
| ○ | 105% |
| ○ | 110% |

FIG. 15B 42C  145

| | |
|---|---|
| ○ | 110% |
| ○ | 105% |
| ○ | 100% |
| ○ | 95% |
| ○ | 90% |
| ○ | 90% |
| ○ | 95% |
| ○ | 100% |
| ○ | 105% |
| ○ | 110% |

IMAGE PROCESSING APPARATUS, IMAGE PROCESSING METHOD, RECORDING APPARATUS, AND NON-TRANSITORY COMPUTER-READABLE STORAGE MEDIUM

BACKGROUND

1. Field

Aspects of the present invention generally relate to an image processing apparatus, an image processing method, a recording apparatus, and a non-transitory computer-readable storage medium storing a program, which are provided for recording an image on a recording medium.

2. Description of the Related Art

There is an inkjet recording apparatus including a nozzle array in which a plurality of ejection openings (nozzles) capable of ejecting ink are arranged. One of factors of not being able to obtain a high-quality image in such an inkjet recording apparatus may be density unevenness of an image resulting from variations in ejection characteristics of a recording head. In an inkjet recording apparatus including a plurality of recording elements (nozzles), the ejection characteristics of the individual recording elements vary, and thereby density unevenness may occur in a recorded image. The variations in ejection characteristics of the recording elements are classified into variations in a landing position of ink and variations in an ejection volume, which may result from variations in a heating value of a heater that heats ink, variations in a nozzle aperture, and so forth. Also, the amounts of ink ejected from the individual recording elements may vary due to variations in a heating value of a heater caused by change over time or variations in viscosity of ink caused by a difference in an environment where the apparatus is used. Such density unevenness becomes significant in accordance with an increase in the size of the recording head, and use of a multihead.

To address such variations in ejection characteristics of a recording head, a multipass recording method is available. In the multipass recording method, an image is recorded through a plurality of scanning operations by using more nozzles, and thus influences of individual nozzles on a recording medium are reduced, and thereby density unevenness is reduced.

As another method for reducing density unevenness, head shading correction is available. In head shading correction, a test pattern recorded by using a recording head and having an even density is read, and a correction table is created for correcting the density values of pieces of image data corresponding to individual nozzles so that density unevenness is reduced. As a result of correcting the pieces of image data corresponding to the individual nozzles by using the correction table, an image without density unevenness is stably output.

U.S. Pat. No. 6,874,864 discloses, in addition to the multipass recording method, a method for making it difficult to visually recognize a boundary streak by setting a recording ratio of a nozzle positioned at an end portion of a nozzle array to be lower than a recording ratio of nozzle positioned at a portion other than the end portion.

Also, a calibration technique is available as a technique of reducing color unevenness resulting from variations in ejection characteristics of individual nozzle arrays or recording heads. Japanese Patent Laid-Open No. 2004-167947 describes a method for measuring the density of a patch by using a scanner that is provided on a carriage to read the patch, and automatically performing color unevenness correction (calibration) on the basis of the measurement result. In this method, calibration is performed for individual recording heads corresponding to individual ink colors, and density correction values of individual gradation levels of individual ink colors are obtained.

In the case of performing multipass recording of two passes or more by using a head shading correction method according to the related art, if the usage ratio of each nozzle varies in individual rasters when one raster is recorded by using a plurality of nozzles, the processing load for performing appropriate correction is high. It is necessary to generate a correction table by recording and measuring a test pattern of even density for each number of passes and each type of mask pattern, and thus a large amount of data processing and a large capacity memory are necessary.

In the method disclosed in U.S. Pat. No. 6,874,864, the usage ratios of a plurality of nozzles used for recording vary among individual rasters, and thus more significant density unevenness occurs. In the method disclosed in Japanese Patent Laid-Open No. 2004-167947, it is impossible to reduce color differences resulting from variations in ejection characteristics of individual nozzles.

SUMMARY

According to an aspect of the present invention, there is provided an image processing apparatus for recording an image on a unit region of a recording medium by performing a plurality of relative scanning operations, each of the plurality of relative scanning operations being a scanning operation of a plurality of recording element groups relative to the unit region performed by using a recording head including the plurality of recording element groups, each including a different recording element. The image processing apparatus includes an input unit, an obtaining unit, and a correcting unit. The input unit is configured to receive image data of an image to be recorded on the unit region. The obtaining unit is configured to obtain, for each of the plurality of recording element groups, a ratio of being used for recoding the image on the unit region. The correcting unit is configured to correct the image data in accordance with the ratios obtained by the obtaining unit and recording characteristic information representing recording characteristics of the plurality of recording element groups.

Further features of the present disclosure will become apparent from the following description of exemplary embodiments with reference to the attached drawings.

BRIEF DESCRIPTION OF THE DRAWINGS

FIGS. 1A to 1C are diagrams illustrating density unevenness resulting from an ejection state of a recording head during 1-pass recording.

FIGS. 2A to 2C are diagrams illustrating density unevenness resulting from an ejection state of a recording head during 2-pass recording.

FIGS. 15A and 15B are diagrams for describing density ratios of individual nozzle groups according to the third embodiment.

DESCRIPTION OF THE EMBODIMENTS

First Exemplary Embodiment

Figure 3:
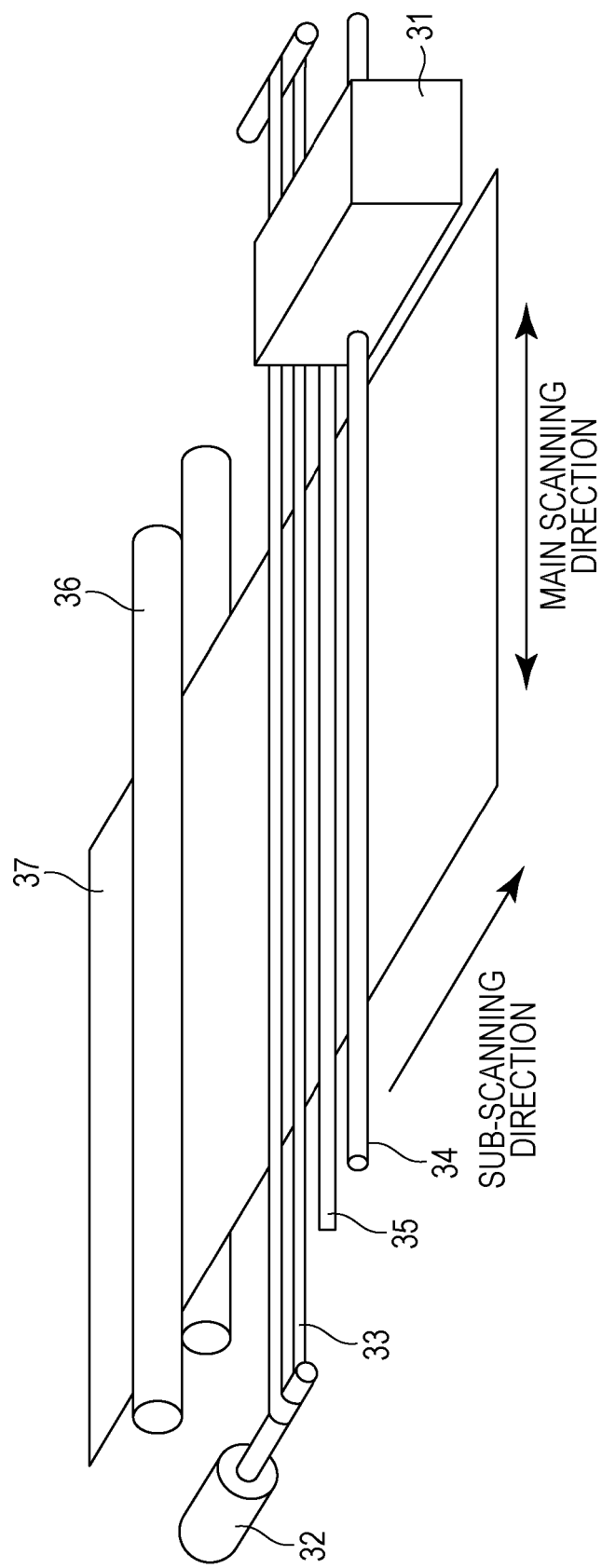
FIG. 3 is a diagram for describing a schematic configuration of an inkjet recording apparatus.

Hereinafter, an exemplary embodiment will be described with reference to the drawings.

First, with reference to FIGS. 1A to 2C, a description will be given of multipass recording, in which an image is recorded by scanning the same region a plurality of times. This is one of methods for suppressing density unevenness resulting from variations in an ejection volume of a recording head.

FIGS. 1A to 1C illustrate an example of a case where so-called 1-pass printing is performed. In 1-pass printing, an image is recorded through one scanning operation using a recording head. FIG. 1A illustrates a state where ink drops ejected from eight recording elements provided on the recording head vary in the volume and direction. If 1-pass printing is performed by using such a recording head having variations in ejection characteristics, dots whose sizes and landing positions vary in individual printing rows corresponding to the recording elements are formed in a print region of a recording medium as illustrated in FIG. 1B. The variations in the sizes and landing positions of the dots formed on the recording medium may generate a white portion that is seen at the center of FIG. 1B and a portion where dots overlap more than necessary. FIG. 1C illustrates a density distribution of an image formed of dots illustrated in FIG. 1B. Such variations in image density may be recognized as a white streak or black streak of the image.

FIGS. 2A to 2C are explanatory diagrams illustrating a case where multipass recording is performed by using the recording head illustrated in FIG. 1A. As illustrated in FIG. 2A, the print region (unit region) illustrated in FIG. 1A is scanned three times by using the recording head, so as to form an image. At this time, in two regions each of which is half the print region and is formed of four vertically-arranged pixels, an image is formed through two scanning operations. In the case where an image is recorded through two scanning operations, the eight recording elements of the recording head are grouped into upper and lower regions, each being formed of four recording elements, and a dot printed by one recording element through one scanning operation is formed by thinning desired image data to half by using a certain method. Then, the recording medium is conveyed a distance corresponding to four pixels, and dots are complementarily formed with the other half of the image data by using recording elements different from those used in the first scanning operation. FIGS. 2B and 2C illustrate the density of the recorded image. As can be seen, density unevenness is reduced compared to the case illustrated in FIGS. 1A to 1C. As described above, in the multipass recording method, one dot line in the scanning direction of the recording head (main scanning direction) is recorded by using a plurality of different recording elements, and accordingly an influence of variations in ejection characteristics of the individual recording elements can be reduced. Hereinafter, one dot line is referred to as one raster.

FIG. 3 is a perspective view illustrating the internal configuration of an inkjet recording apparatus according to this embodiment. In accordance with a movement of a timing belt 33 driven by a carriage (CR) motor 32, a carriage 31 having a recording head thereon reciprocates in the main scanning direction of FIG. 3 while being guided and supported by a guide shaft 34. A flexible cable 35 electrically connects a board of the main body of the apparatus and the recording head while following the movement of the carriage 31. A conveying roller pair 36 pinches a recording medium 37 and conveys, in accordance with rotations thereof, the recording medium 37 in a certain direction (sub-scanning direction) that crosses the main scanning direction. A main scanning operation in which the carriage 31 moves in the main scanning direction with the recording head ejecting ink in accordance with recording data, and a conveyance operation performed in accordance with rotations of the conveying roller pair 36 are alternately and repeatedly performed, and thereby an image is formed on the recording medium 37 step by step.

Figure 4:
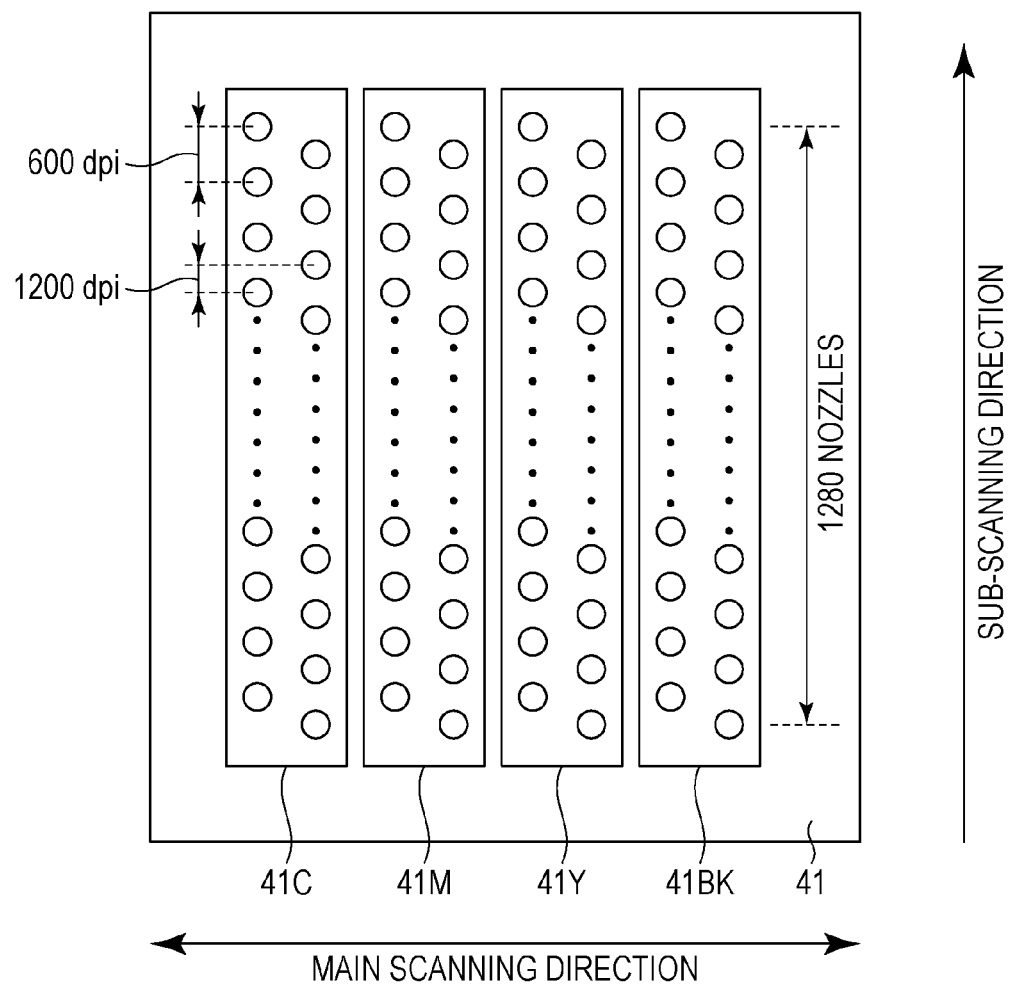
FIG. 4 is a schematic diagram for describing recording elements provided on a recording head.

FIG. 4 is a schematic diagram illustrating the recording element side of a recording head 41 according to this embodiment. The recording head 41 includes, for each ink color, a recording element array in which 1280 recording elements (hereinafter also referred to as nozzles) are arranged in the sub-scanning direction with a density of 1200 dots per inch. A nozzle array 41C that ejects cyan ink, a nozzle array 41M that ejects magenta ink, a nozzle array 41Y that ejects yellow ink, and a nozzle array 41BK that ejects black ink are arranged in the main scanning direction of the recording head 41. Each of the nozzle arrays 41C, 41M, 41Y, and 41BK is formed of two nozzle arrays, in which nozzles are arranged with a density of 600 dots per inch, arranged in a staggered pattern with a shift of $\frac{1}{1200}$ inches. These two arrays are regarded as one nozzle array, and accordingly 1200 dots per inch can be formed on a recording medium. The amount of ink drop (ejection volume) ejected from each nozzle is about 4.5 pl. However, the ejection volume of black ink may be set to be larger than that of the other inks in order to realize high density. The recording head according to this embodiment includes inkjet recording elements that eject ink by using heat energy, and includes, in each nozzle, an electro-thermal converter for generating heat energy.

As a result of ejecting ink while the recording head 41 being scanned in the main scanning direction, dots can be formed with a recording density of 2400 dpi (dots per inch) in the main scanning direction and 1200 dpi in the sub-scanning direction. The recording head 41 that ejects inks of four colors (CMYK) may have units for individual colors that are independent of one another, or may have an integrated structure. Further, light cyan ink and light magenta ink may be added to the above-described four inks in order to increase granularity, or red ink, green ink, and blue ink may be added in order to increase color development.

Example Configuration of Image Processing System

Figure 5:
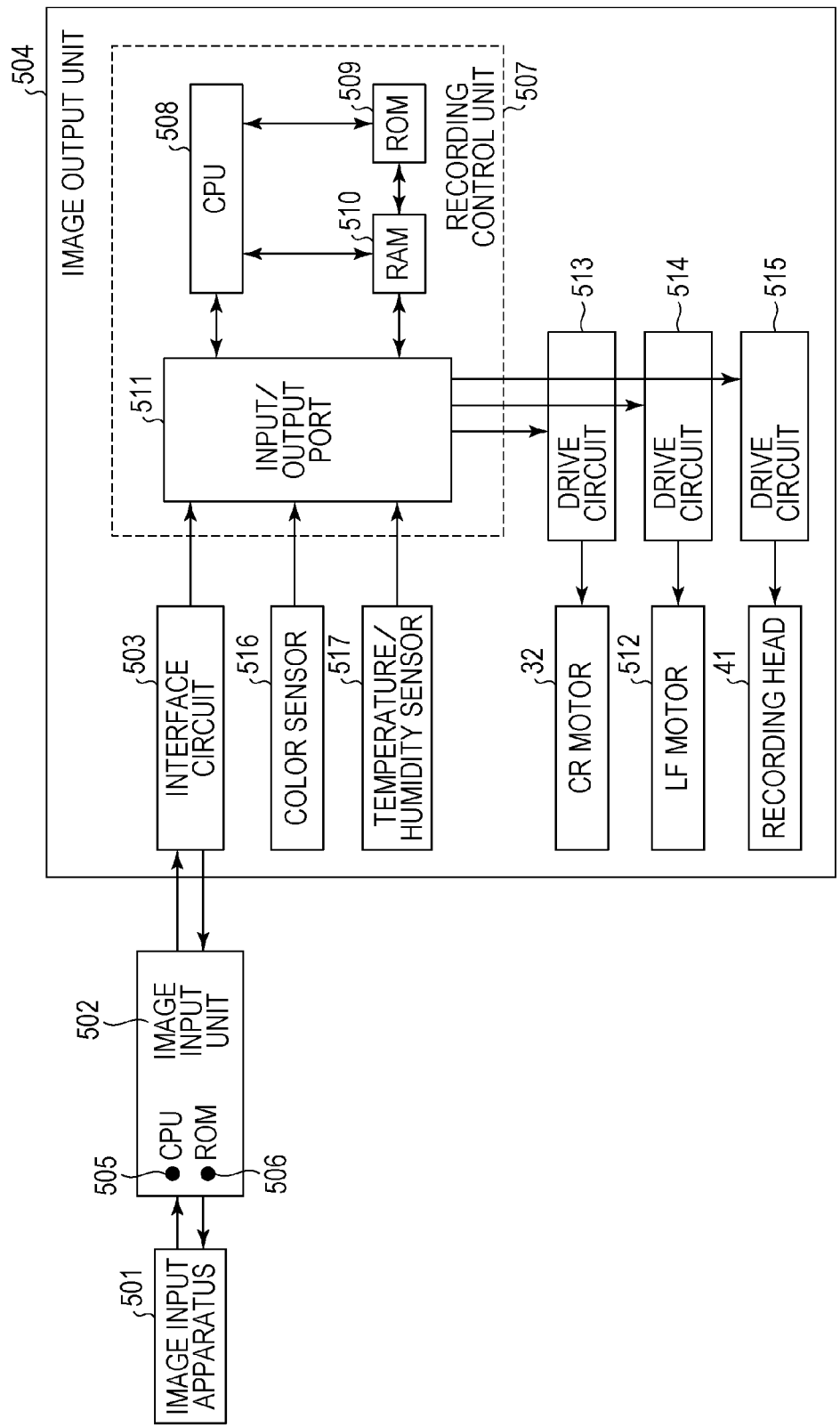
FIG. 5 is a block diagram illustrating the configuration of a control system of the inkjet recording apparatus.

Next, a description will be given of a control configuration for performing recording control of the inkjet recording apparatus. FIG. 5 is a block diagram for describing the configuration of a control system of the inkjet recording apparatus illustrated in FIG. 3. First, multivalued image data stored in an image input apparatus 501 such as a scanner or digital camera or a storage medium such as a hard disk is input to an image input unit 502. The image input unit 502 is a host computer connected to the outside of the inkjet recording apparatus, and transfers image information to be recorded to an image output unit 504 serving as a recording apparatus via an interface circuit 503. The image input unit 502 is provided with a central processing unit (CPU) 505 that is used to transfer image data and a storage device (read only memory (ROM) 506). The host computer may be a computer serving as an information processing apparatus, or may be an image reader or the like.

A recording control unit 507 includes a CPU 508, a storage device (ROM 509) storing a control program or the like, and a random access memory (RAM) 510 serving as a working area for performing various image processing operations. The ROM 509 stores various data, such as a control program for the CPU 508 and a parameter used for a recording operation. The ROM 509 according to this embodiment is an electrically erasable programmable ROM (EEPROM), and the information stored therein can be electrically rewritten. The information is saved even after the power of the recording apparatus has been turned off. The RAM 510 is used as a working area for the CPU 508, and temporarily stores various data, such as image data received from the image input unit 502 and generated recording data. Also, the ROM 509 stores lookup tables (LUTs) 602, 604, and 606 and a contribution ratio table 104, which will be described below with reference to FIG. 6. The RAM 510 stores patch data for recording patches. The LUTs 602, 604, and 606 and the contribution ratio table 104 may be stored in the RAM 510, and the patch data may be stored in the ROM 509.

The recording control unit 507 performs image processing (described below) on the input multivalued image data that has been transferred from the image input unit 502, and thereby converts the image data into binary image data. The recording control unit 507 includes an input/output port 511, which is connected to drive circuits 513, 514, and 515 for the CR motor 32 in the conveying unit, a conveying (LF) motor 512, and the recording head 41. Further, the input/output port 511 is connected to sensors, such as a color sensor 516 that is used for measuring a color patch and detecting a recording medium, and a temperature/humidity sensor 517 for detecting a temperature and humidity of the surrounding environment. On the basis of the binary image data generated through conversion by the recording control unit 507, an image is formed by applying ink onto a recording medium from the individual recording elements of the recording head 41.

Figure 6:
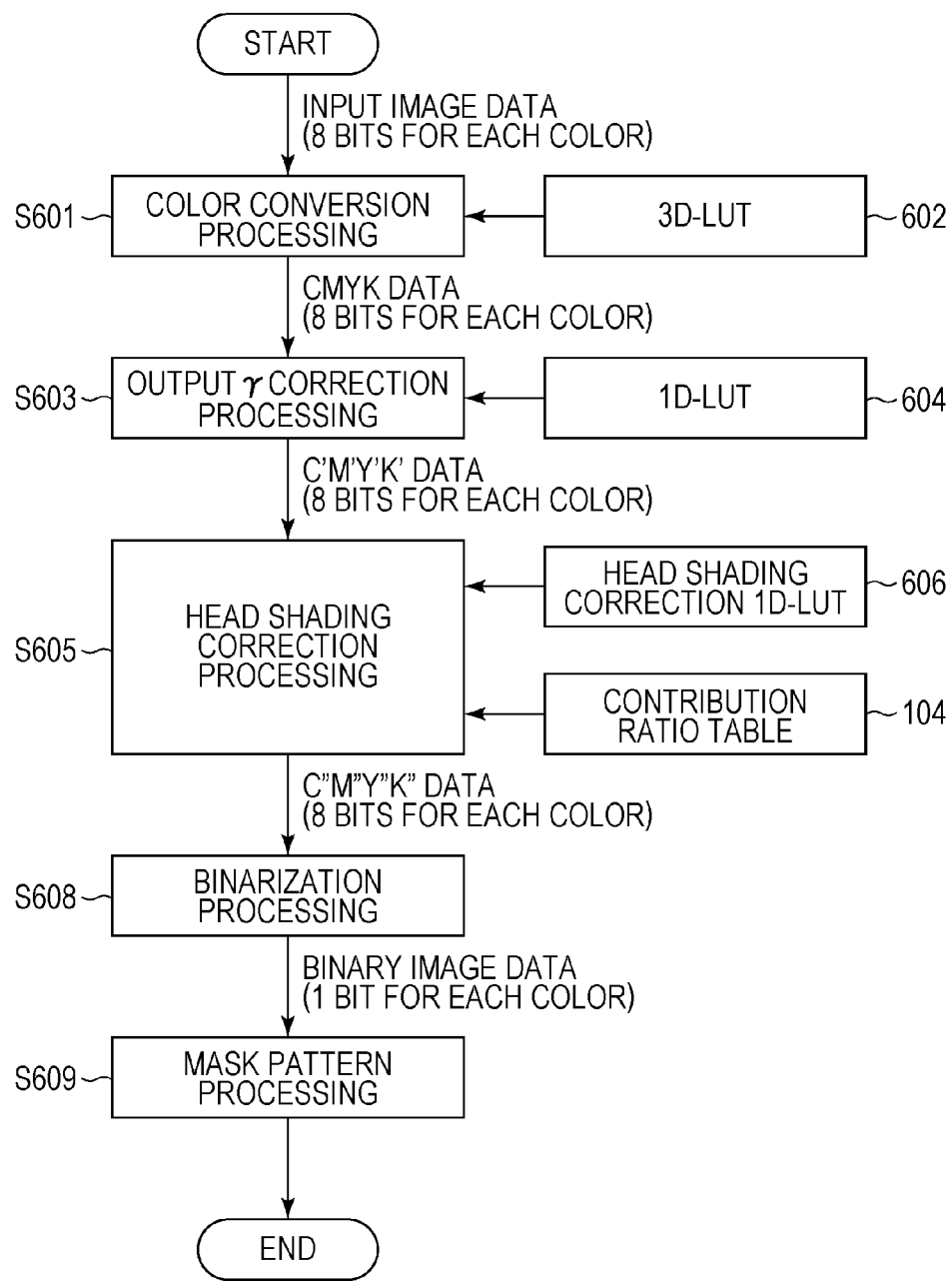
FIG. 6 is a flowchart illustrating the processing performed by a recording control unit.
Figure 11:
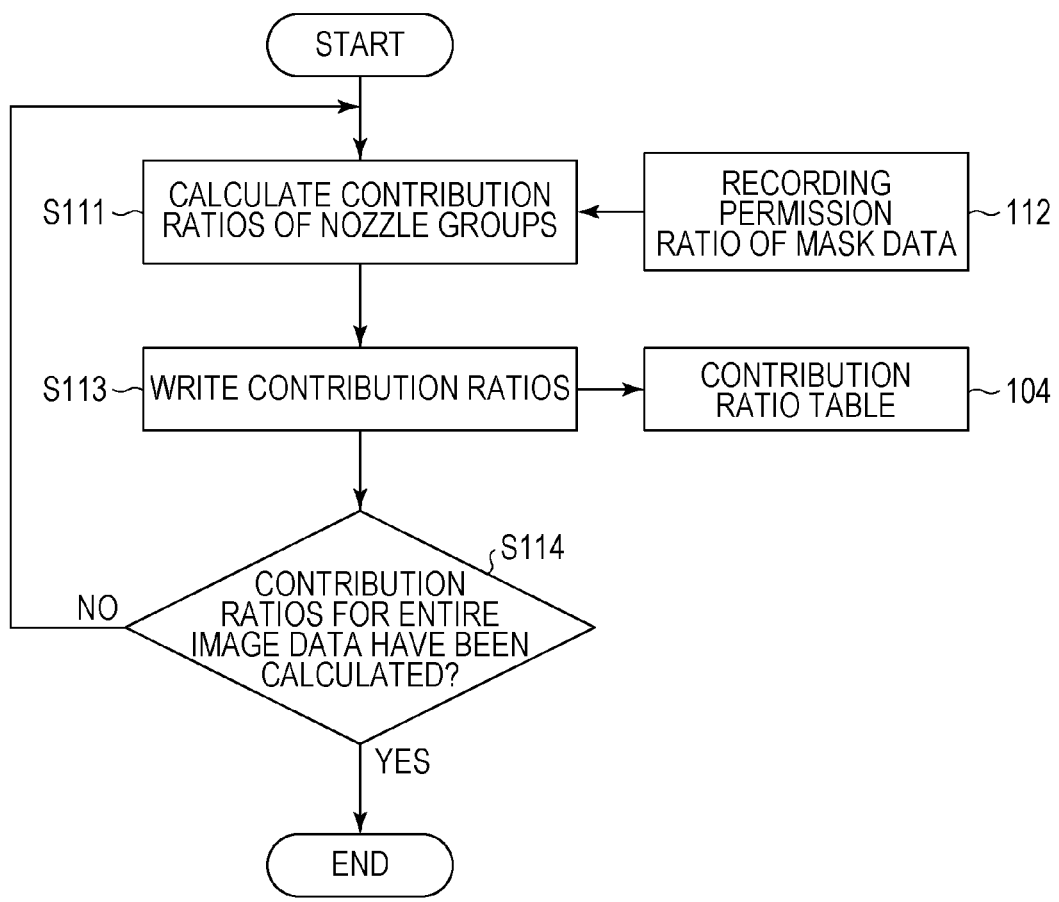
FIG. 11 is a flowchart illustrating the processing of calculating contribution ratios for individual rasters.

FIG. 6 is a flowchart illustrating the processing performed by the recording control unit 507 illustrated in FIG. 5. This flow starts when the recording apparatus receives a print job from a host computer. The print job includes recording condition information indicating recording conditions of a recording mode for recording an image, such as the number of passes in multipass recording, an amount of margin or an amount of portion that lies off the edge, the magnification of an image, and so forth, in addition to image data of the image to be recorded. On the basis of the image data and the recording condition information, the recording control unit 507 determines the nozzles to be used for recording of individual pixels of the image data. Although the details will be described below, in response to receipt of a print job, the processing illustrated in FIG. 11 is performed in parallel with the processing illustrated in FIG. 6, and a contribution ratio table to be used in head shading correction processing in step S605 in FIG. 6 is generated. The contribution ratio table may be generated after a print job has been received until step S605 is executed, and the timing of the processing is not limited.

Upon a print job being received by the recording apparatus, color conversion processing is performed in step S601. In the color conversion processing, input image data in which each color is constituted by 8 bits is converted to density signals of C, M, Y, and K. Specifically, with reference to the three-dimensional color conversion LUT 602, the input image data is converted, on a pixel by pixel basis, to multilevel gradation data (CMYK data) of a plurality of ink colors available by a printer.

The number of dimensions of the color conversion LUT 602 indicates the number of components (elements) of the input image data that is subjected to the color conversion processing in step S601. However, the color conversion LUT 602 holds only density signals for specific and discrete RGB signals, and does not support all the combinations of RGB expressed in 256 levels for each color. Thus, interpolation processing is performed for the RGB signals in a region that is not supported, by using a plurality of pieces of data held therein. Here, an interpolation processing method according to the related art is used, and thus the detailed description is omitted. The value of the multilevel gradation data (CMYK data) obtained through the color conversion processing in step S601 is expressed by 8 bits, like the input image data as an input value, and is output as a density value having a gradation value of 256 levels.

In step S603, output γ correction processing is performed, in which CMYK data that has undergone color conversion is corrected. Here, the data is corrected for each ink color with reference to the 1D-LUT 604, which is a one-dimensional correction table, so as to maintain linearity for a density signal representing the optical density that is eventually expressed on a recording medium. The 1D-LUT 604 is generated on the basis of a recording head having a standard recording characteristic. The C'M'Y'K' data output here has a density value of 8 bits like the input image data.

In step S605, density correction processing (head shading correction processing) is performed on the density value of 8 bits by using the HS correction one-dimensional LUT 606 and the contribution ratio table 104, and thereby C"M"Y"K" data is generated. In the above-described output γ correction processing in step S603, a 1D-LUT created for a standard recording head is used, and thus individual variations in recording heads or variations in recording characteristics of individual nozzles may occur. Thus, in step S605, head shading correction (hereinafter referred to as HS correction) is performed, in which variations in recording characteristics are corrected in units of nozzles.

In step S608, binarization processing is performed, in which the data is converted to 1-bit binary image data defining the recording positions of dots recordable by the recording head 41. A typical multivalued error diffusion processing is adoptable as the binarization processing. In step S609, a mask pattern to be used in mask pattern processing (described below) is selected on the basis of the binary image data, and output image data for each scanning operation is generated.

An optimal conversion method in the color conversion processing in step S601, the output γ correction processing in step S603, the head shading correction processing in step S605, and the binarization processing in step S608 varies according to the type of recording medium and the type of image to be recorded. In particular, the three-dimensional color conversion lookup table (3D-LUT) 602 used in color conversion processing is prepared for each type of recording medium.

Figure 7:
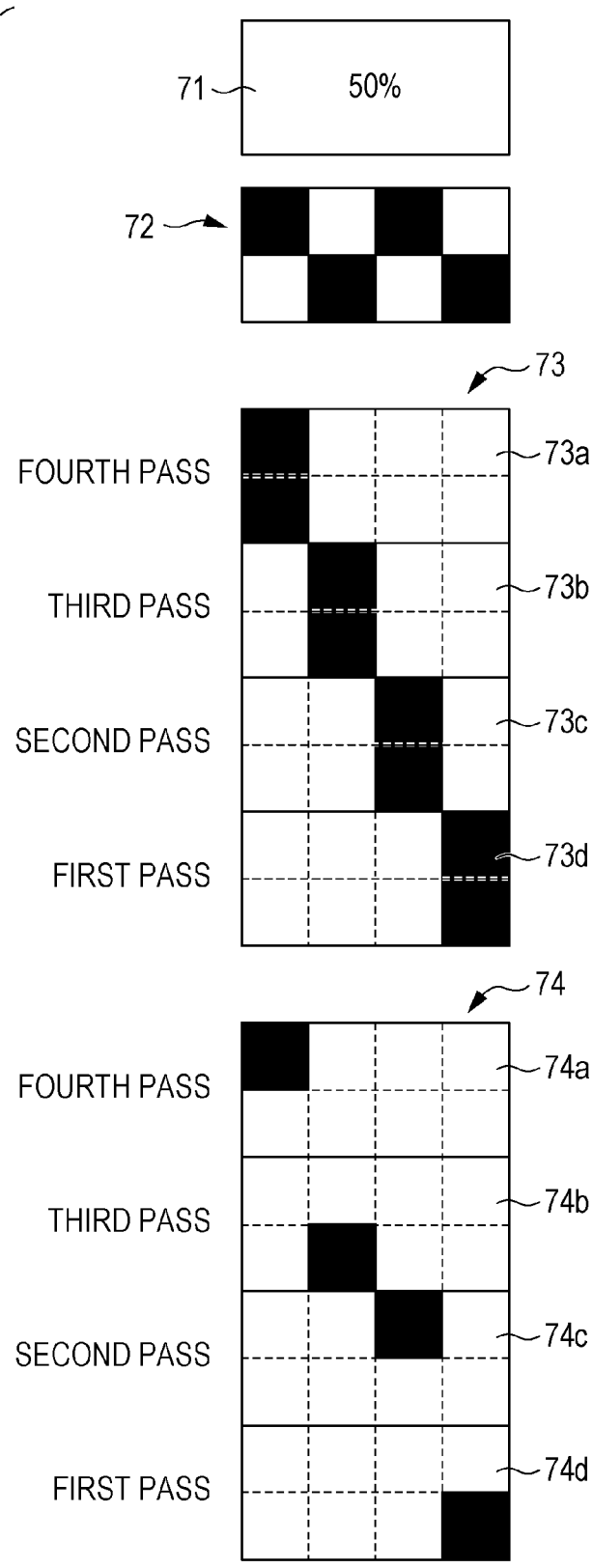
FIG. 7 is a diagram for describing mask pattern processing.

With reference to FIG. 7, a detailed description will be given of the mask pattern processing in step S609. A mask pattern is stored in the ROM 509 in the recording control unit 507. In the mask pattern processing in step S609, image data of individual colors is divided into recording scanning regions by using the mask pattern, and thereby pieces of dot data for the individual recording scanning regions and individual ink colors are generated.

Image data 71 represents the recording density of unit pixels in a recording image, which is 50%. Binarization processing is performed on the image pixels of the recording density of 50%, and resolution conversion is performed thereon simultaneously. Accordingly, binary image data 72 having 4×2 recording pixels is obtained. The binary image data 72 has four black pixels representing recording of dots, and four white pixels representing non-recording of dots, that is, the recording density thereof is 50%. In this embodiment, a recording density represents the percentage of pixels on which dots are actually recorded among pixels on a recording medium arranged in 1200 dpi×1200 dpi. That is, a recording density of 50% corresponds to a state where dots are recorded on half of all the pixels.

In FIG. 7, reference numeral 73 denotes an example of a mask pattern used for 4-pass multipass recording in which an image is recorded through four recording scanning operations. This mask pattern is constituted by a plurality of pixel regions, each indicating whether or not recording of a dot is permitted. A black region is a recording permitted pixel for which recording of a dot is permitted, whereas a white region is a recording non-permitted pixel for which recording of a dot is not permitted. Individual mask patterns 73a to 73d have a uniform recording permission ratio of 25%, and complement one another to achieve a total recording permission ratio of 100%.

Nozzles in a nozzle array are grouped into four regions in the vertical direction. The nozzles included in the individual regions record dots in accordance with the mask patterns 73a to 73d corresponding to the individual regions of the mask pattern 73 and image data. In each scanning operation, the logical AND of the mask patterns 73a to 73d and the binary image data 72 obtained through binarization processing is calculated, and thereby the pixels on which recording is actually performed in individual scanning operations are determined. Reference numeral 74 denotes a result of the logical AND, in which the positions of pixels on which recording is performed in individual recording scanning operations are arranged in the vertical direction. As can be seen, recording is performed on one pixel in each recording scanning operation. For example, output image data 74b recorded in the second recording scanning operation is led from the logical AND of the binary image data 72 and the mask pattern 73b. That is, a dot is recorded only in a case where there is pixel data recorded in binary image data and recording is permitted in the mask pattern. Here, a mask pattern having a region of 4 pixels×8 pixels is illustrated to simplify the description, but the mask pattern has a larger region in both the main scanning direction and the sub-scanning direction. In particular, it is general that the number of nozzles in a nozzle array of the recording head is the same as the number of pixels in the mask pattern in the sub-scanning direction.

Method for Generating Head Shading Correction LUT

Next, a description will be given of a method for generating the HS correction one-dimensional LUT 606 with reference to FIG. 8. Here, a measurement result of a patch is obtained for each nozzle group (each recording element group) of the recording head 41, and a density value of each nozzle group of the recording head 41 is obtained. The density value is stored as recording characteristic information. In this embodiment, head shading correction processing (step S605) is performed after output γ processing (step S603) and before binarization processing (step S608).

Figure 8:
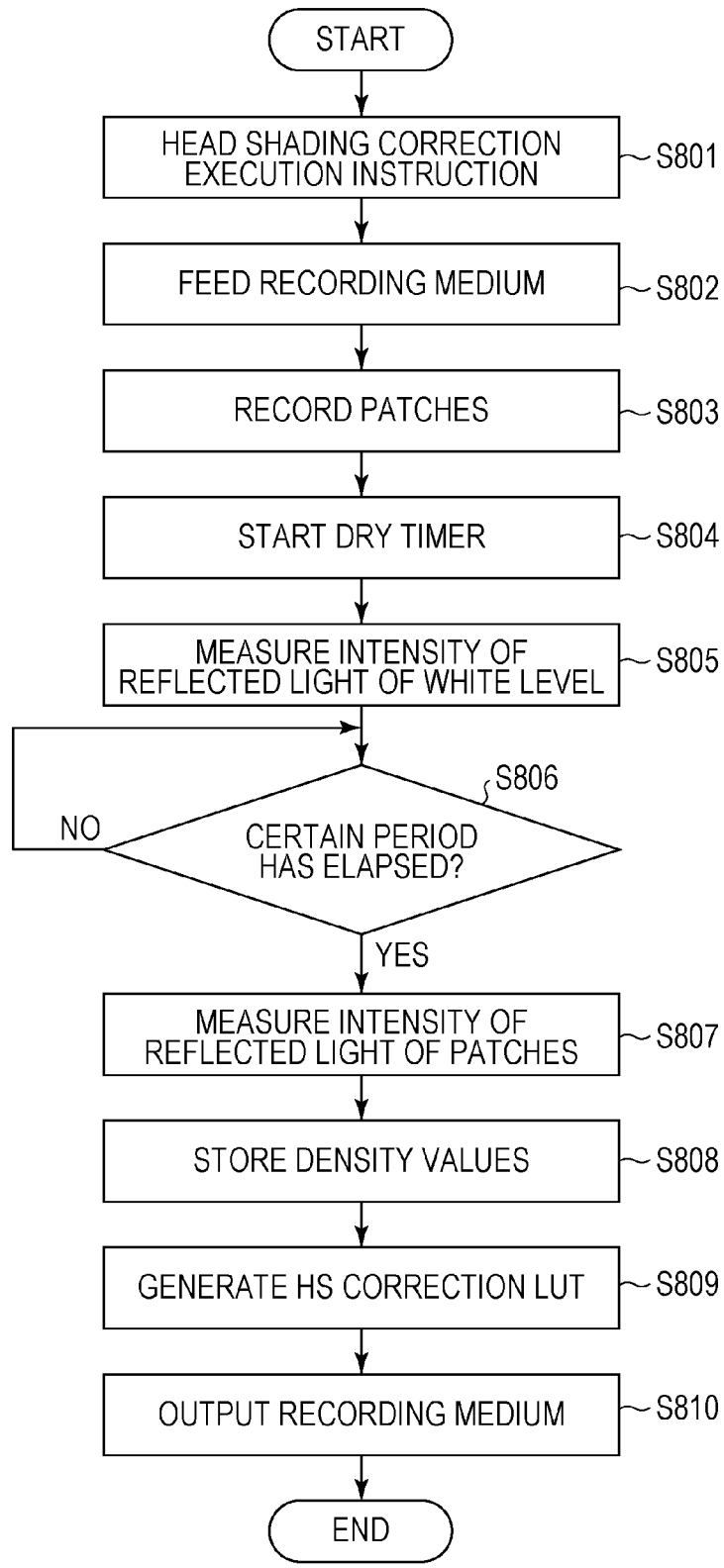
FIG. 8 is a flowchart illustrating head shading correction processing.

FIG. 8 is a flowchart illustrating the processing of generating the HS correction one-dimensional LUT 606. First, in step S801, a head shading correction execution instruction for recording a patch and measuring the density is input from the CPU 505 of the image input unit 502 or an operation panel (not illustrated) of the image output unit 504. In response to the input of the head shading correction execution instruction, the image output unit 504 feeds, from a paper feed tray, a recording medium on which a test pattern is to be recorded in step S802. After the recording medium has been conveyed to a region where recording by the recording head 41 is possible, a conveyance operation of the recording medium in the sub-scanning direction and recording scanning in the main scanning direction of the carriage 31 driven by the carriage motor 32 are alternately performed in step S803. Subsequently, with use of the recording head 41, a test pattern including patches that are necessary to obtain the density values of individual regions of the recording head 41 is recorded on the recording medium.

Figure 9:
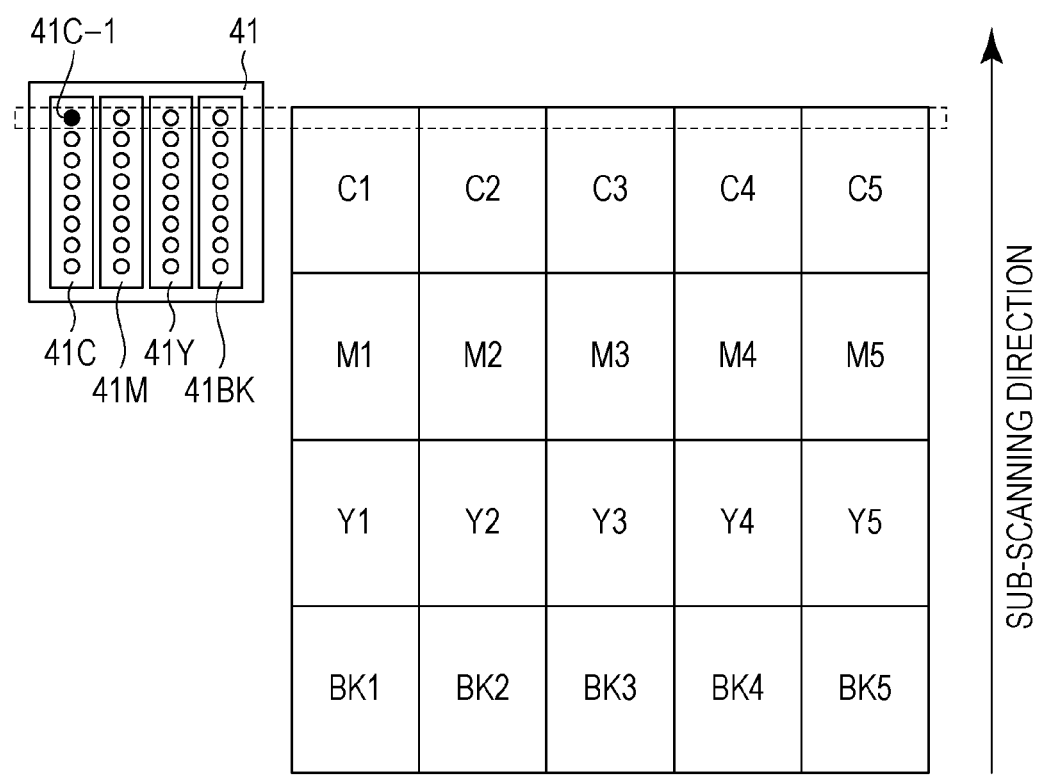
FIG. 9 illustrates an example of patches used for head shading correction.

FIG. 9 is a schematic diagram of the test pattern that is recorded in step S803. In FIG. 9, alphabetic characters and numbers are used to distinguish individual patches from one another, but the patches actually have a uniform density and correspond to individual ink colors. In FIG. 9, the alphabetic characters C, M, Y, and BK assigned to the individual patches are reference symbols indicating the patches recorded by using the inks ejected from the nozzle arrays 41C, 41M, 41Y, and 41BK illustrated in FIG. 4. The numbers 1 to 5 next to the alphabetic characters indicate the ranks of density gradation of color patches to be recorded. Here, the density increases as the number increases. For example, a patch C1 is a patch that has been recorded by the nozzle array 41C which ejects cyan ink and that has a density gradation 1. The number of levels of gradation is not limited to 5. Further, the number does not necessarily correspond to the level of gradation, and the density may increase as the number decreases.

The length in the sub-scanning direction of each patch corresponds to a width over which recording can be performed with the recording head, that is, a nozzle width. In each patch, image data on the N-th row from the downstream side of conveyance of a recording medium in the sub-scanning direction (upper side of the figure) is recorded by using the N-th nozzle from the top in the recording head 41. For example, the first row on the downstream side in the sub-scanning direction of recorded patches (the first row from the top) is recorded by using the nozzle on the first row from the downstream side in the sub-scanning direction of the nozzle array of the recording head (the first nozzle from the top). Also, the second row from the downstream side in the sub-scanning direction (the second row from the top) is recorded by using the nozzle on the second row from the downstream side in the sub-scanning direction (the second nozzle from the top). On the basis of a measurement result obtained by measuring the output patches, the density characteristics of the individual nozzle groups can be obtained.

Referring back to FIG. 8, in step S804, a timer counter for drying the recorded patches for a certain period is started. Subsequently, in step S805, the intensity of reflected light of a white level (the original color of the recording medium) where no patch is recorded is measured by using the color sensor 516. The measurement result of the white level is used as a reference value for calculating the density value of a patch that is recorded thereafter. The measurement result is held for each light-emitting diode (LED) serving as a light source of the color sensor 516. As the density of a blank space of the recording medium where no patch is recorded, the original color of the recording medium is measured. If the recording medium is white, the original color thereof is white. In this embodiment, a description will be given of an example in which a white recording medium is used.

If it is determined in step S806 that the certain period has elapsed in the counter of the dry timer, the intensity of reflected light of each patch is measured in step S807. The measurement of the intensity of reflected light is performed by turning on an LED appropriate for the ink color for which the density is to be measured among the LEDs mounted on the color sensor 516 and reading reflected light of the patch. For example, a green LED is turned on to measure a patch recorded by using M ink and a blank portion (white) where no patch is recorded. A blue LED is turned on to measure a patch recorded by using Y ink and K ink and a blank portion (white) where no patch is recorded. A red LED is turned on to measure a patch recorded by using C ink and a blank portion (white) where no patch is recorded. Measurement of the intensity of reflected light of each patch is performed sequentially or in units of the pitches of nozzles in the sub-scanning direction. Measurement of the intensity of reflected light may be performed for each nozzle, or a plurality of nozzles. In this embodiment, measurement is performed in units of two nozzles.

After reading of patches has been finished, the density values of the patches are calculated for the corresponding nozzle groups on the basis of the output values of the patches and the blank portion (white) in step S808. At the time of measuring a patch, density values for two nozzles may be collectively read. Alternatively, a density value for one nozzle may be read at two positions, and the density values at the two positions may be averaged. The read density values of individual nozzle groups are stored in the ROM 509 or the RAM 510 of the recording control unit 507.

In step S809, the HS correction one-dimensional LUT 606, which is used for head shading correction processing, is generated on the basis of the measured density values of individual nozzle groups. The HS correction one-dimensional LUT 606 is density correction data indicating the correspondence between uncorrected density values of individual nozzles and density values that have been corrected to target values, and is independently generated for each nozzle group. The target value is a certain target density that is determined in advance. Data is generated for correcting the density value of image data for each nozzle group so that the density value (measured value) of a recorded patch becomes closer to the target value. A patch may be recorded in advance by using an inkjet recording apparatus and a recording head having a high accuracy, and a value obtained by measuring the density thereof may be used as a target value. With use of the generated HS correction one-dimensional LUT 606 and contribution ratios described below, corrected density values of image data are determined in units of rasters on the basis of uncorrected density values of image data.

The HS correction one-dimensional LUT 606 is generated by the CPU 508 of the recording control unit 507 or the CPU 505 of the image input unit 502. The HS correction one-dimensional LUT 606 may be generated for each type of recording medium or each resolution. The generated HS correction one-dimensional LUT 606 is stored in the ROM 509 of the recording control unit 507.

The HS correction one-dimensional LUT 606 may be generated for each usage environment, or may be generated every time image processing is performed to record an image, instead of generating and storing it at the time of performing correction. Alternatively, a table generated in advance may be selected on the basis of patches recorded by a patch recording unit.

Figure 10:
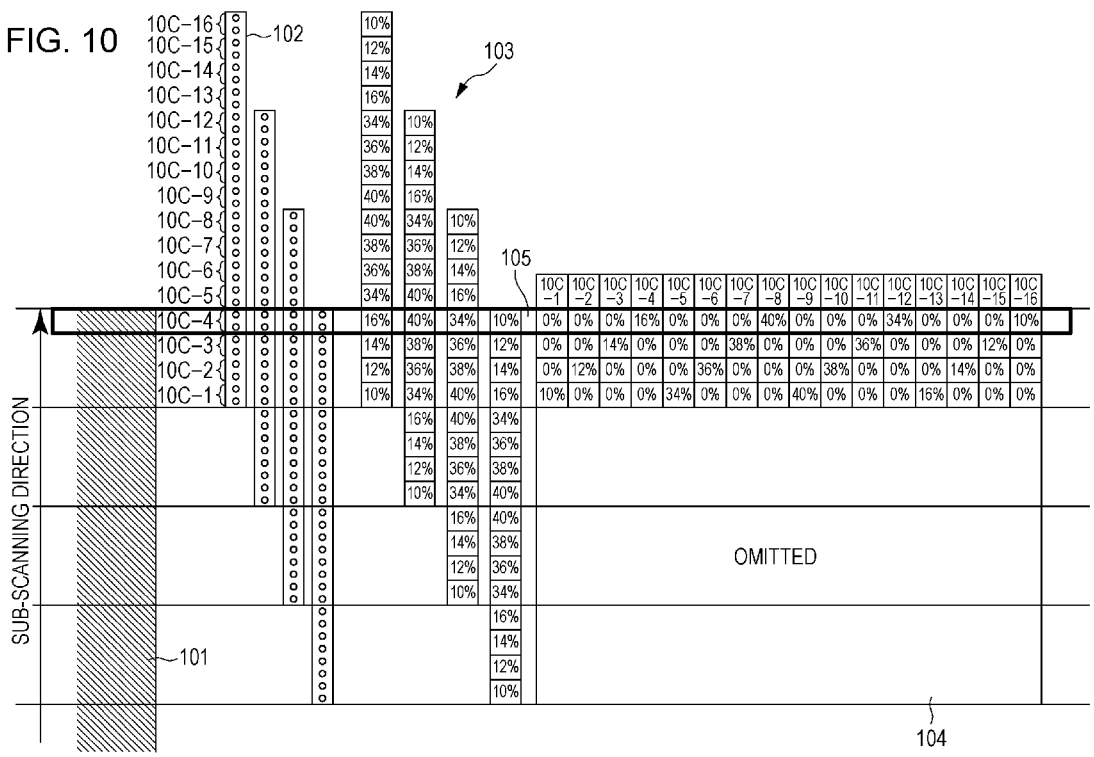
FIG. 10 is a diagram for describing the correspondence between image data and contribution ratios in multipass recording.

Subsequently, the recording medium is output in step S810, and the processing ends. In this way, the content of the HS correction one-dimensional LUT 606 can be updated every time the above-described processing is performed.
Method for Generating Contribution Ratios Next, a description will be given of contribution ratios used for head shading correction of this embodiment with reference to FIG. 10. Reference numeral 101 denotes image data that is recorded on a recording medium. Reference numeral 102 denotes a movement of a recording head at the time of 4-pass recording. In FIG. 10, reference numeral 102 denotes only the nozzle array 41C for cyan ink among nozzle arrays of the recording head 41, in order to simplify the description. Here, each nozzle array includes 32 nozzles. Also, reference numeral 102 denotes a positional relationship between the recording head and the recording medium in a case where the recording medium is conveyed a distance corresponding to 8 nozzles in the sub-scanning direction every time one recording scanning operation of the recording head 41 is performed. The lateral lines represent the boundaries of recording scanning operations. As indicated by an arrow, the upper side of the figure is the direction in which the recording medium is conveyed (sub-scanning direction). The 32 nozzles of the nozzle array 41C are grouped into 16 nozzle groups, each group including 2 nozzles, and the numbers 10C-1 to 10C-16 are assigned to the individual nozzle groups. Reference numeral 103 denotes the recording permission ratios of the mask pattern corresponding to the individual nozzle groups, each including 2 nozzles. The total sum of the recording permission ratios of four regions that complement one another is 100%. Normally, the positional relationship between the nozzle array 41C of the recording head 41 and the mask pattern is fixed. Thus, if the recording medium is conveyed in the sub-scanning direction and the positional relationship between the image data 101 and the recording head 41 is changed during the scanning operations of 4-pass recording, the positional relationship between the image data 101 and the mask pattern is also changed.

A contribution ratio is a usage ratio of a nozzle that is used for recording image data in individual image regions. Thus, the contribution ratio is changed according to the positional relationship between the image data and the recording head (mask pattern). For example, in a case where the contribution ratio is 100%, the corresponding image data is recorded only by using the nozzle groups whose contribution ratio is 100%.

With reference to the flowchart illustrated in FIG. 11, a description will be given of a method for generating a contribution ratio table for each image region. As described above, this flow is started when the recording apparatus receives a print job and image data is supplied from the image input unit 502 to the image output unit 504. In step S111, the positional relationship between a recording permission ratio 112 of mask data and image data is determined on the basis of recording condition information representing recording conditions included in the print job. On the basis of the determined positional relationship, the contribution ratios of nozzle groups used for recording of a certain number of rasters are calculated. Subsequently, in step S113, the calculated contribution ratios are written into the contribution ratio table 104. In step S114, it is determined whether or not calculation of contribution ratios for the entire image data has been finished. If calculation has been finished, the processing ends. Otherwise, the processing returns to step S111, and the contribution ratios of the next certain number of rasters are calculated.

With use of the generated contribution ratio table, head shading processing in step S605 in FIG. 6 is performed, and then an operation of recording on a recording medium is started. The processing from step S605 may be performed in order from the region for which a contribution ratio table has been generated. In a case where a recording operation is started before the contribution ratio tables corresponding to all the image regions have been generated, the time lag between when a job including an instruction for image recording is transmitted to the recording apparatus to when a printing operation starts can be shortened. The contribution ratio table 104 is written on the ROM 509 of the recording control unit 507. Alternatively, the contribution ratio table 104 may be written on the RAM 510 or the ROM 506 of the image input unit 502. Alternatively, the contribution ratio table 104 may be stored in advance, and may be selected in accordance with a pass mask to be used.

Referring back to FIG. 10, the contribution ratio table 104 will be described. The contribution ratio table 104 is a table in which the ratios of using individual nozzle groups from the nozzle group 10C-1 to the nozzle group 10C-16 are determined for each raster of image data. For example, for an image region 105 in the image data, an image is recorded by using four nozzle groups: the nozzle group 10C-4, the nozzle group 10C-8, the nozzle group 10C-12, and the nozzle group 10C-16. Thus, in the contribution ratio table 104, the contribution ratios for the positions corresponding to the above-described four nozzle groups are larger than 0, and the contribution ratios of nozzle groups that are not used are 0. The contribution ratio table 104 is determined in accordance with the positional relationship between image data and a nozzle array of the recording head. The number of elements in the sub-scanning direction of the contribution ratio table 104 is the same as the size in the sub-scanning direction of the image data. As a recording permission ratio of a mask pattern used to calculate the contribution ratios of individual nozzle groups, the number of recording permitted pixels in the mask pattern may be counted. In this embodiment, a recording permission ratio table corresponding to the size of a nozzle group is stored in advance as a table corresponding to the mask pattern.

Head shading correction may be performed in units of nozzle groups each including one or more nozzles. However, an effect is obtained also in the case of performing correction in units of a plurality of rasters, and thus the unit of correction may be determined from the viewpoint of processing speed and correction effect. Each nozzle group may include one nozzle, or two or more nozzles. In this embodiment, two rasters correspond to a unit region, and image data is corrected in units of two nozzles.

Head Shading Correction

Figure 12B:
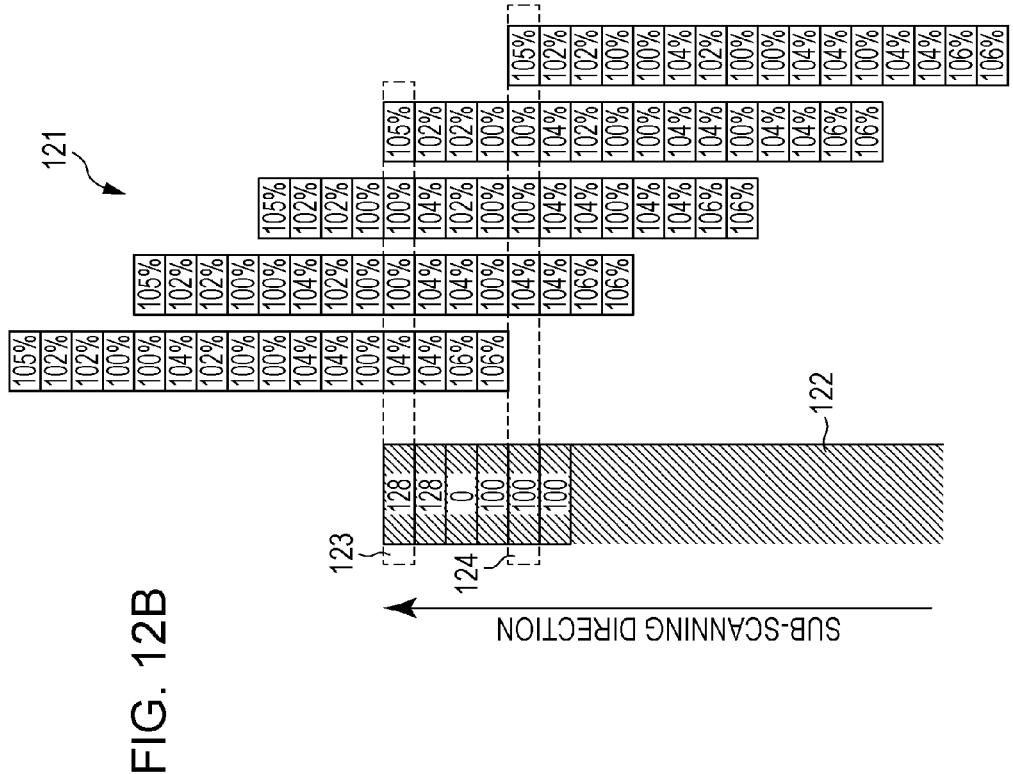
FIGS. 12A and 12B are diagrams for describing density ratios.
Figure 12A:
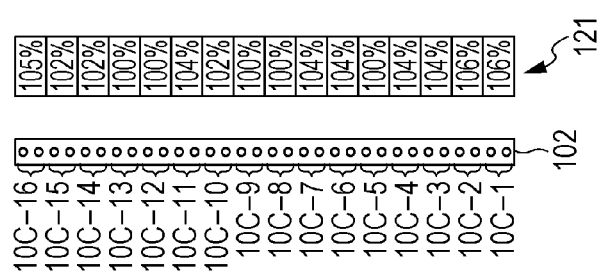

With reference to FIGS. 12A and 12B, head shading correction processing will be described. In this embodiment, the density of image data is corrected by using the HS correction one-dimensional LUT 606 generated for each nozzle group on the basis of the density value of each nozzle group, and the contribution ratio table 104. The product of a contribution ratio, which is information representing the ratio of each nozzle group used to perform recording in each unit region of the image data, and the density ratio of the nozzle group is obtained, and the sum of all the nozzle groups used for recording in the unit region serves as an output value.

FIG. 12A is a diagram illustrating the correspondence between density ratios 121 of the recording head 41 denoted by reference numeral 102 and the nozzle groups 10C-1 to 10C-16. Hereinafter, a method for calculating the density ratios 121 will be described. The HS correction one-dimensional LUT 606, which is calculated on the basis of the density values of individual nozzle groups by performing the above-described processing illustrated in FIG. 8, is used. With use of the uncorrected density value of image data and the HS correction one-dimensional LUT 606, the corrected density values of individual nozzle groups are calculated. The density ratio 121 is obtained by dividing a corrected density value by an uncorrected density value. As the density ratio 121 increases, the uncorrected density value becomes smaller than a target value.

FIG. 12B illustrates the correspondence between image data 122 and the density ratios 121 of the individual nozzle groups of the nozzle array 41C in the case of performing 4-pass recording. The image data 122 is cyan image data that is recorded by using the nozzle array 41C for cyan ink, and the values written in individual image regions are 8-bit density values. For example, the density value of image data to be recorded in an image region 123 is 128. The contribution ratios of individual nozzle groups in the image region 123 are as follows: 16% for the nozzle group 10C-4, 40% for the nozzle group 10C-8, 34% for the nozzle group 10C-12, 10% for the nozzle group 10C-16, and 0% for the other nozzle groups. The density ratios of the nozzle groups 10C-4, 10C-8, 10C-12, and 10C-16 are 104%, 100%, 100%, and 105%, respectively.

A density ratio of 100% indicates that, in a case where the density value of image data is 128, the density of a recorded image is 128. Thus, a calculation value in the case of recording the image region 123 by using the nozzle groups having the above-described density ratios is calculated by using the following expression.

$$128 \times (1.04 \times 0.16 + 1 \times 0.40 + 1 \times 0.34 + 1.05 \times 0.10) \approx 129.5$$

In FIG. 12B, the density ratio of the nozzle group 10C-4 for performing recording in the image region 123 in the first scanning operation is 104%, and the density ratio of the nozzle group 10C-4 for performing recording in an image region 124 in the second scanning operation is also 104%. Since the density value of image data in the image region 124 is 100, the following expression may be used for recording in the image region 124.

$$100 \times (1.04 \times 0.16 + 1 \times 0.40 + 1 \times 0.34 + 1.05 \times 0.10) \approx 101.1$$

In this embodiment, the value is rounded to the nearest whole number, and thus the corrected density value of the image region 123 is 130, and the corrected density value of the image region 124 is 101. The above-described processing is repeatedly performed on all the regions of the image data in units of two rasters, and thereby head shading correction is performed.

In this embodiment, the value of the density ratio 121 is set to be constant regardless of the uncorrected density value of image data, in order to simplify the description. However, in a case where the corrected density value that is lead from the HS correction one-dimensional LUT 606 varies depending on the uncorrected density value, it is necessary to allow the density ratio 121 of the recording head to vary in accordance with the uncorrected density value.

As a result of performing the above-described HS correction, in a case where a plurality of nozzles are used to record one raster of image data, density values can be corrected by using contribution ratios even if the usage ratios of the nozzles are different. With this configuration, density unevenness between image regions caused by variations in ejection volume among individual nozzles can be suppressed.

A contribution ratio table may be stored in a ROM in advance, but it is desirable that a contribution ratio table be generated every time a print job is received. In this embodiment, a contribution ratio table is generated after the nozzle groups to be used for recording in individual image regions have been determined. Accordingly, image data can be appropriately corrected even if a combination of nozzle groups used for recording differs between different regions in the sub-scanning direction, such as a center portion and an edge portion of a recording medium.

Specifically, an amount of margin for bordered printing and an amount of image data that lies off the edge of a recording medium for borderless printing are not always constant, and may be set to an arbitrary value in accordance with a user setting or image data. The positional relationship between a recording head and a recording medium varies depending on the amount of margin or the amount of image data that lies off the edge, and accordingly the usage ratios of individual nozzle groups vary. Thus, the ratios of using individual nozzle groups for recording in an image region on a recording medium (contribution ratios) vary depending on a print job in many cases. Thus, a contribution ratio table may be generated every time a print job is received, instead of being stored in the ROM 509.

One contribution ratio may be set in the main scanning direction, and a plurality of contribution ratios of a certain size may be set in the sub-scanning direction. The contribution ratio may be within a bandwidth, and may be the same size as the unit of head shading correction. In this embodiment, a mask pattern is set so that the usage ratios of individual nozzles of the nozzle array 41C decrease in the portion nearer to the end of the nozzle array, but the usage ratios are not limited thereto. The usage ratios may be set to be equal in the entire region of the nozzle array 41C. Only a part of the nozzle array 41C may be used.

In this embodiment, a method of repeatedly using a combination of the same contribution ratios is used. Thus, a memory capacity can be reduced by storing only the minimum repetition unit of a contribution ratio table.

In this embodiment, a description has been given of an example of storing density values as recording characteristic information of individual nozzle groups. Alternatively, measurement results of patches of individual nozzle groups or HS correction LUTs of individual nozzle groups may be stored as recording characteristic information.

Second Exemplary Embodiment

In the first embodiment, a description has been given of an example of generating the HS correction one-dimensional LUT 606 for each nozzle group on the basis of a measurement result of a test pattern and storing the HS correction one-dimensional LUT 606 in the ROM 509. In a second exemplary embodiment, a description will be given of a method for storing a measurement result of a test pattern in the ROM 509 and generating HS correction data for each image region upon receipt of a print job in the recording apparatus.

In the flowchart illustrated in FIG. 8, steps S801 to S808 are the same as in the first embodiment. In this embodiment, a measurement result of patches is stored in the ROM 509 in step S808, and the processing proceeds to step S810 without performing generation of the HS correction LUT in step S809, and the recording medium is output before finishing the processing. In the ROM 509, a measurement result of patches of a plurality of densities is stored for each nozzle group.

Upon a print job being received by the recording apparatus, a contribution ratio table is generated in accordance with the flowchart illustrated in FIG. 11. On the basis of the generated contribution ratio table and the measurement result of each nozzle group stored in the ROM 509, the HS correction one-dimensional LUT 606 is generated for each image region. With use of the generated HS correction one-dimensional LUTs 606, multivalued pieces of image data for individual image regions are corrected, and an image is recorded in accordance with the corrected pieces of image data.

With this method, the capacity of the ROM 509 can be saved compared to the case of storing HS correction LUTs, and head shading correction processing can be performed with a simple configuration. In the first embodiment, a constant value is used as a value of a density ratio regardless of the value of image data. On the other hand, in the method according to this embodiment, an HS correction one-dimensional LUT is generated for each image region, and thus appropriate correction can be performed in accordance with a density value.

Third Exemplary Embodiment

Figure 13:
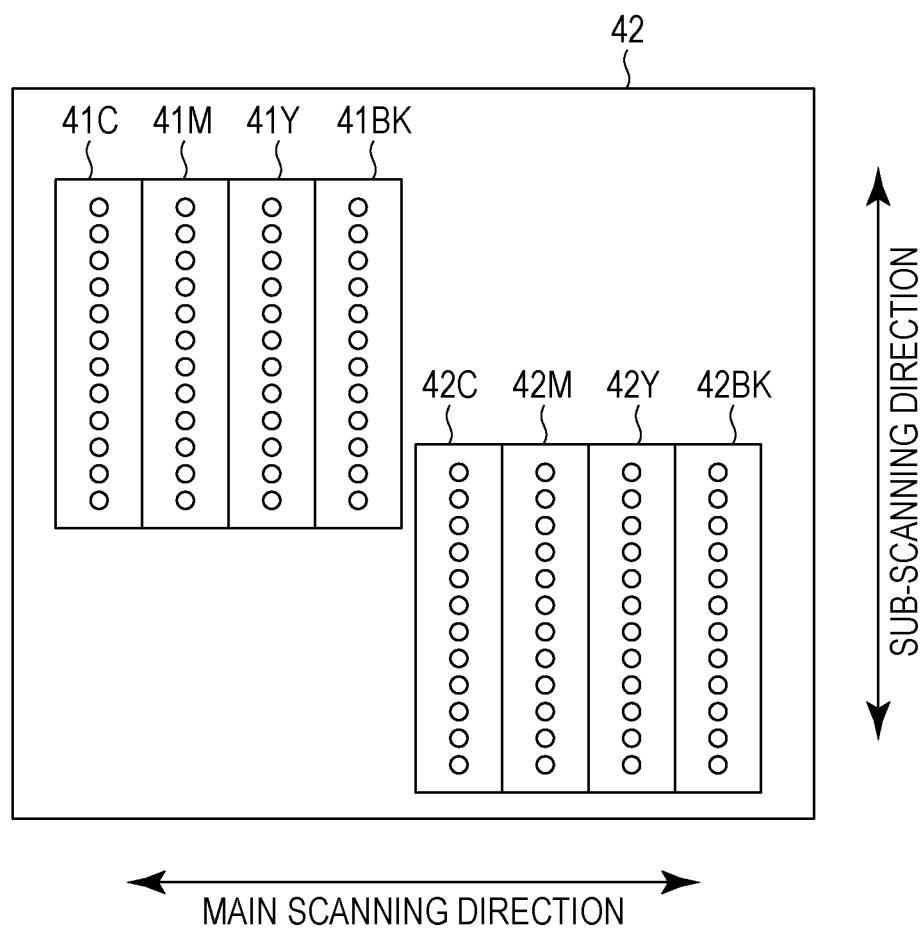
FIG. 13 is a diagram for describing a recording head according to a third embodiment.

In a third exemplary embodiment, a recording head 42 illustrated in FIG. 13 is used. The recording head 42 has an overlapped portion in which nozzle arrays that eject ink of the same colors are overlapped in the scanning direction. FIG. 13 is a diagram illustrating the recording head 42 according to this embodiment viewed from the ink ejection surface. Nozzle arrays 41C and 42C are nozzle arrays that eject cyan ink. Nozzle arrays 41M and 42M are nozzle arrays that eject magenta ink. Nozzle arrays 41Y and 42Y are nozzle arrays that eject yellow ink. Nozzle arrays 41BK and 42BK are nozzle arrays that eject black ink. These nozzle arrays are staggered in the sub-scanning direction so as to form the overlapped portion. To simplify the description, the nozzle arrays 41C to 41BK are referred to as upper nozzle arrays, and the nozzle arrays 42C to 42BK are referred to as lower nozzle arrays. In this embodiment, the nozzle arrays 41C and 42C each have ten nozzles, which are grouped into ten nozzle groups, each including one nozzle. The nozzle array 41C includes nozzle groups 41-1 to 41-10 from the downstream side in the conveyance direction, and the nozzle array 42C includes nozzle groups 42-1 to 42-10 from the downstream side in the conveyance direction.

In this embodiment, HS correction one-dimensional LUTs for the upper nozzle arrays and HS correction one-dimensional LUTs for the lower nozzle arrays are generated for individual colors. Also, density ratios of individual nozzles obtained in an HS correction one-dimensional LUT generation process are set for the upper nozzle arrays and the lower nozzle arrays.

Figure 14:
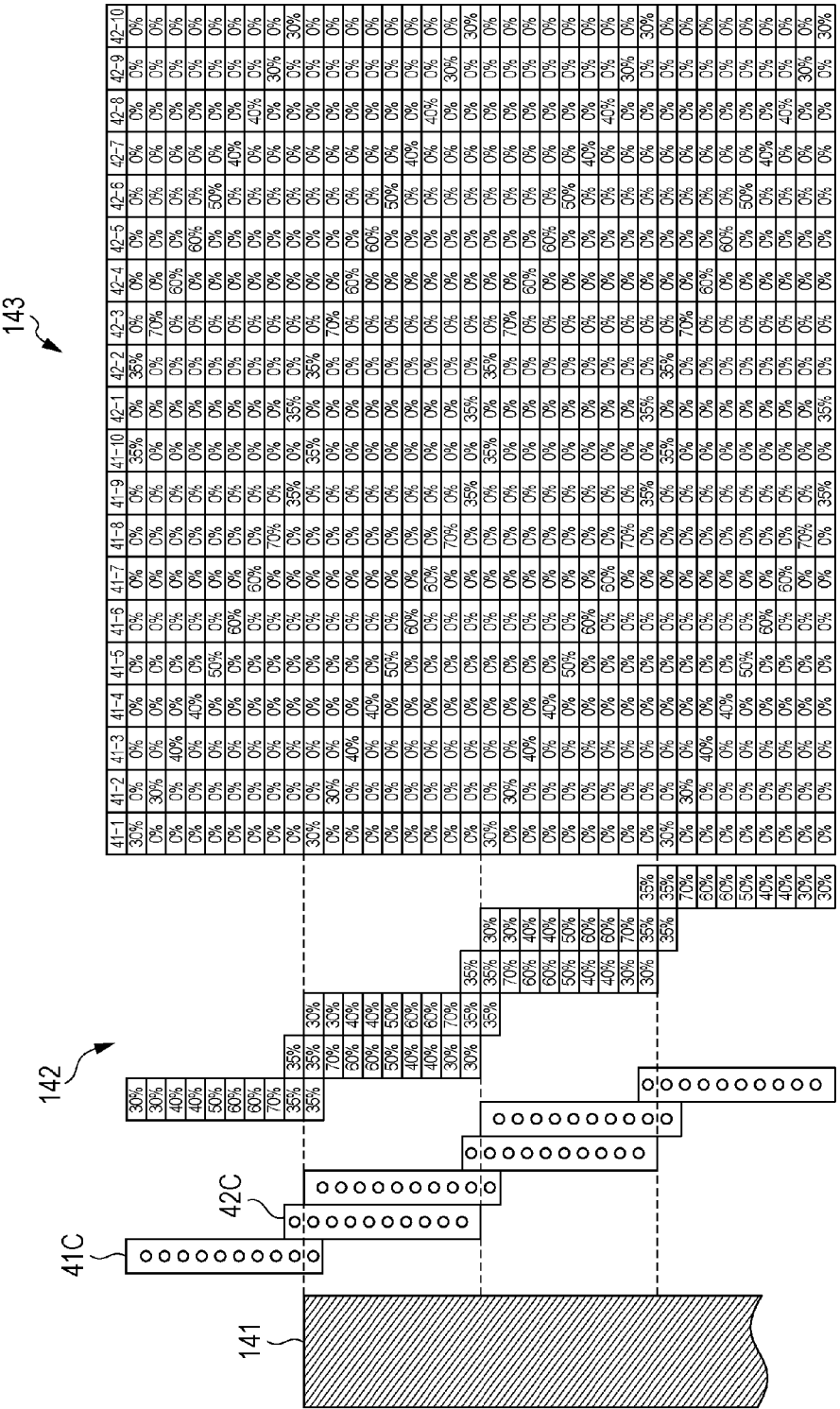
FIG. 14 is a diagram illustrating head shading processing according to the third embodiment.

FIGS. 14, 15A, and 15B are diagrams for describing head shading correction processing according to this embodiment. In FIG. 14, reference numeral 141 denotes image data corresponding to individual regions, and reference numeral 142 denotes a mask table indicating the positional relationship between a recording medium and the nozzle arrays 41C and 42C of the recording head 42 in individual scanning operations. Here, an example of 2-pass recording is illustrated, in which recording of an image is completed through two scanning operations. In each scanning operation, image data is distributed to the nozzle arrays 41C and 42C, and an image is recorded by the two nozzle arrays. The mask table 142 shows the recording ratios of a mask pattern corresponding to the nozzle arrays 41C and 42C. In a non-overlapped portion where the nozzle arrays 41C and 42C do not overlap each other, recording ratios are set to be decreased toward the end portion of the non-overlapped portion. On the other hand, in an overlapped portion where the nozzle arrays 41C and 42C overlap each other, recording ratios are set to 35% in every nozzle array.

Reference numeral 143 denotes a contribution ratio table showing the contribution ratios of the individual nozzle groups in a case where recording data is allocated to the first scanning operation and the second scanning operation on the basis of the mask table 142. On the basis of the positional relationship between a recording medium and the nozzle arrays 41C and 42C in the individual scanning operations, and the mask table 142 showing the recording ratios of the nozzle arrays 41C and 42C, the contribution ratios of the nozzle groups 41-1 to 41-10 and 42-1 to 42-10 are obtained. For example, the nozzle contribution ratio of the top raster of the image data 141 is recorded by using the nozzle groups 41-10, 42-2, and 41-1. On the basis of the mask data 142, the contribution ratio of the nozzle group 41-10 is set to 35%, the contribution ratio of the nozzle group 42-2 is 35%, and the contribution ratio of the nozzle group 41-1 is 30%. The nozzle groups 41-2 to 41-9, 42-1, and 42-3 to 42-10 are not used for this raster recording operation, and thus the nozzle contribution ratios thereof are set to 0%.

FIGS. 15A and 15B illustrate tables 144 and 145 showing the density ratios of the individual nozzle groups, which are obtained by performing the processing illustrated in FIG. 8. The method for calculating the density ratios is the same as the method for calculating the density ratio 121 according to the above-described embodiment. As a result of correcting image data by using the density ratios of the individual nozzle groups illustrated in FIGS. 15A and 15B and the contribution ratio table 143, corrected data can be generated. The method for calculating correction values is the same as in the above-described embodiment.

As described above, according to this embodiment, even in a case where there are a plurality of nozzle arrays that ejects the same ink and the contribution ratios of the individual nozzle groups are different in individual rasters, density unevenness can be reduced by performing density correction by using contribution ratios and density ratios.

OTHER EMBODIMENTS

Additional embodiments can also be realized by a computer of a system or apparatus that reads out and executes computer executable instructions recorded on a storage medium (e.g., computer-readable storage medium) to perform the functions of one or more of the above-described embodiments, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Figure 16A:
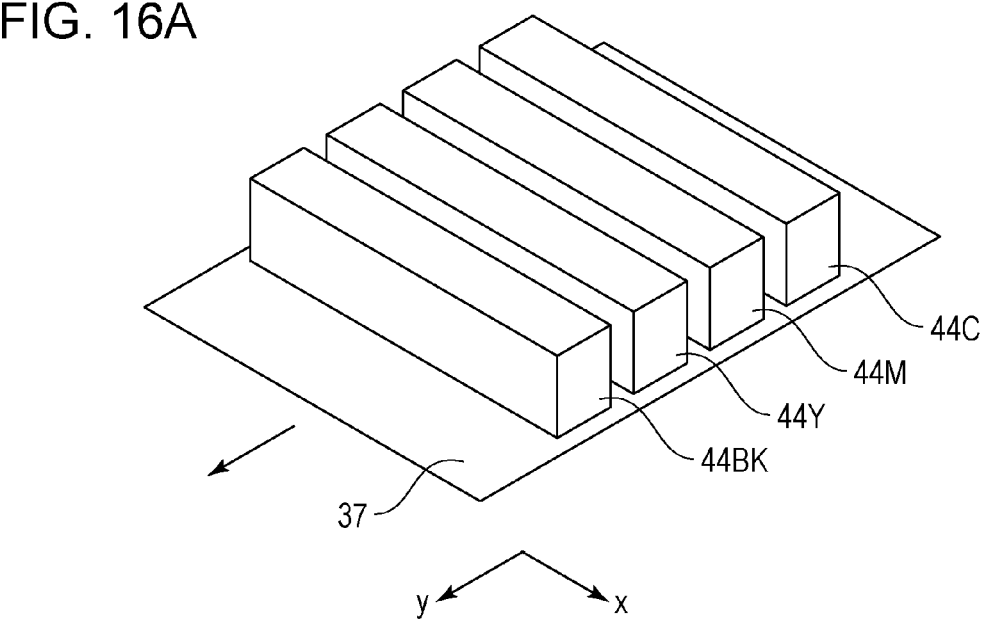
FIGS. 16A and 16B are diagrams for describing the configuration of a recording apparatus according to another embodiment.

In the above-described embodiments, a description has been given of an example of a recording apparatus that performs a so-called serial process, in which scanning with a recording head and conveyance of a recording medium are sequentially performed, but these embodiments are not seen to be limiting. Any other recording apparatuses are applicable as long as the apparatuses complete recording of an image in a unit region by performing a plurality of relative scanning operations of a recording head and a recording medium. For example, as illustrated in FIG. 16A, a recording apparatus adopting a so-called full-multi scheme may be used. Such a recording apparatus conveys, with respect to a recording head including a plurality of recording element arrays, a recording medium in a direction that crosses a direction in which recording elements are arranged. In FIG. 16A, recording heads 44C, 44M, 44Y, and 44BK are provided for individual ink colors of CMYK. In each recording head, a plurality of recording element arrays are arranged in the x direction of FIG. 16A. The individual recording heads of CMYK are fixed, and a recording medium 37 is conveyed in the y direction. The recording head of each color includes a plurality of recording element arrays that eject ink of the same color. In each of the plurality of recording element arrays, a relative movement between a recording element used for recording in a unit region and a unit region on a recording medium is regarded as one relative scanning operation. That is, one conveyance of the recording medium 37 with respect to a recording head is regarded as a plurality of relative scanning operations.

Figure 16B:
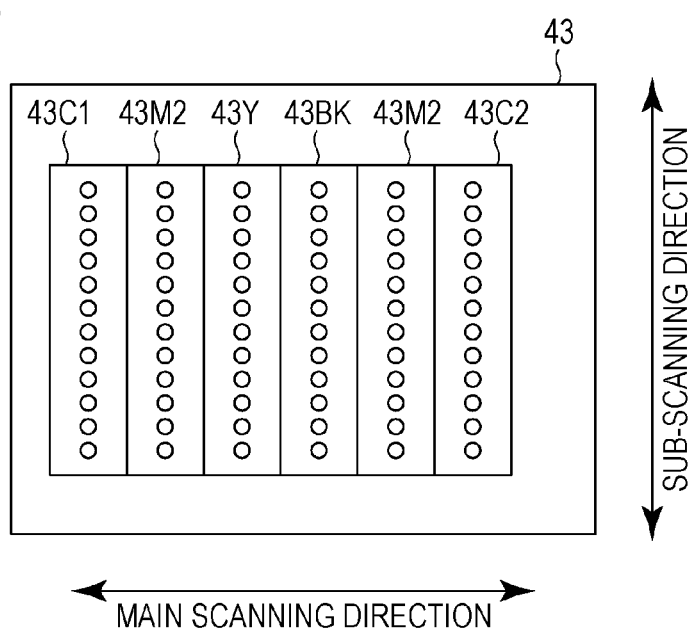

Alternatively, an image may be recorded on a recording medium by performing one or more scanning operations with a recording head including a plurality of recording element arrays corresponding to ink of the same color. FIG. 16B is a diagram illustrating a recording head 43 including recording element arrays 43C1 and 43C2 corresponding to cyan ink and recording element arrays 43M1 and 43M2 corresponding to magenta ink. In this case, one scanning operation between the recording head 43 and a unit region on a recording medium is regarded as a plurality of relative scanning operations for the unit region. That is, a relative movement between the unit region and a nozzle group included in the recording element array 43C1 is regarded as one scanning operation, and a relative movement between the unit region and a nozzle group included in the recording element array 43C2 is regarded as one scanning operation, and thereby it is regarded that a plurality of relative scanning operations have been performed. The same applies to magenta ink. Also, as a result of performing correction in the same manner as in the above-described embodiments, appropriate correction can be performed on variations in recording characteristics of individual recording element arrays.

Embodiments of the present disclosure are not limited to a method of using an inkjet recording head that ejects ink by using heat energy, but may be applied to a method of ejecting ink by using piezoelectric elements. The recording agent for forming an image is not limited to ink. Any recording methods may be used as long as variations in recording characteristics of individual recording elements may occur.

In the above-described embodiments, a description has been given of an example in which a print job including image data and recording condition information is input from a host computer to a recording apparatus, and the processing operations illustrated in FIGS. 6 and 11 are performed in the recording apparatus. These embodiments are not seen to be limiting. The above-described processing operations may be performed in the host computer side, and data indicating ejection or non-ejection of ink may be input to the recording apparatus. Alternatively, a part of the above-described processing operations may be performed in the host computer side, and the other part may be performed in the recording apparatus side.

With an image processing apparatus, an image processing method, a non-transitory computer-readable storage medium, and a recording apparatus according to an embodiment of the present disclosure, in the case of recording an image of one raster by using a plurality of nozzles, density unevenness caused by variations in ejection of nozzles can be appropriately corrected by using a simple configuration with a low processing load, even if the individual nozzles have different usage ratios.

While the present disclosure has been described with reference to exemplary embodiments, it is to be understood that these exemplary embodiments are not seen to be limiting.

This application claims the benefit of Japanese Patent Application No. 2014-082126, filed Apr. 11, 2014, which is hereby incorporated by reference herein in its entirety.

What is claimed is:

1. An image processing apparatus for recording an image on a unit region of a recording medium by performing a plurality of relative scanning operations of the recording medium and a recording head including a plurality of recording elements, with ejecting a recording agent by each of a plurality of recording element groups formed by one or more recording elements, the image processing apparatus comprising:
   a processor which executes the following steps of
   (i) obtaining image data corresponding to the image to be recorded on the unit region;
   (ii) obtaining a plurality of contribution ratios corresponding to the plurality of recording element groups, wherein each of the plurality of contribution ratios is a use ratio of the respective plurality of recording element groups for recoding the image on the unit region;
   (iii) obtaining a plurality of correcting values corresponding to the plurality of recording element groups, wherein each of the plurality of correcting values is a value for correcting the image data with regard to a characteristic of a recording agent ejection amount in the respective plurality of recording element groups; and
   (iv) correcting the image data in accordance with the plurality of contribution ratios and the plurality of correcting values, and
   a controller which executes recording of the image on the recording medium in accordance with the corrected image data by using the recording head.

2. The image processing apparatus according to claim 1, wherein the processor executes the following step of:
   (iii) obtaining the plurality of correcting values based on a measurement result of a plurality of patches corresponding to the plurality of recording element groups.

3. The image processing apparatus according to claim 2, wherein each of the plurality of correcting values is a value for correcting the characteristic of the recording agent ejection amount such that a density obtained by the measurement result of the patches become closer to a target density.

4. The image processing apparatus according to claim 1, wherein the processor executes the following step of:
   (iv) generating a second correcting value by using the plurality of contribution ratios and the plurality of correcting value, and correcting the image data by using the second correcting value.

5. The image processing apparatus according to claim 4, wherein the processor executes the following step of:
   generating the second correcting value by (i) multiplying each of the plurality of contribution ratios and each of the plurality of correcting values corresponding to the same recording element group, to generate a plurality of multiplying values corresponding to the plurality of recording element groups, and (ii) adding the plurality of multiplying values each other.

6. The image processing apparatus according to claim 1, wherein the processor further executes the following step of:
   generating recording data used for ejecting the recording agent in each of the plurality of relative scanning operations from each of the plurality of recording element groups, based on the corrected image data, by using each of a plurality of mask patterns that include recording permitted pixels in which recording is permitted and recording non-permitted pixels in which recording is not permitted,
   wherein each of the plurality of contribution ratios corresponds to a ratio of a number of the recording permitted pixels in each of the plurality of mask patterns.

7. The image processing apparatus according to claim 1, wherein the image data is multivalued data.

8. The image processing apparatus according to claim 1, wherein a sum of the ratios of the plurality of recording element groups used for recording the image on the unit region is 100%.

9. The image processing apparatus according to claim 1, wherein the plurality of recording elements are arranged in a predetermined direction, and the plurality of relative scanning operations are performed by moving the recording head in a crossing direction that crosses the predetermined direction.

10. The image processing apparatus according to claim 9, wherein the recording medium is conveyed in the predetermined direction between the plurality of relative scanning operations by a length which is larger than a length of one recording element group.

11. The image processing apparatus according to claim 9, wherein the recording head includes a plurality of recording element arrays that correspond to a recording agent of the same color and that are arranged in the crossing direction, and recording in the unit region is performed by using at least one of the recording element groups in each of the plurality of recording element arrays.

12. The image processing apparatus according to claim 1, wherein the plurality of relative scanning operations are performed by conveying the recording medium with respect to the recording head, which is fixed.

13. The image processing apparatus according to claim 1, wherein the recording element is an inkjet recording element that ejects ink.

14. The image processing apparatus according to claim 1, wherein the processor further executes the following step of:
controlling the recording head so as to record the image on the unit region in accordance with the corrected image data.

15. An image processing method for recording an image on a unit region of a recording medium by performing a plurality of relative scanning operations of the recording medium and a recording head including a plurality of recording elements, with ejecting a recording agent by each of a plurality of recording element groups formed by one or more recording elements, the method being executed by a processor which is coupled to a recording apparatus, the image processing method comprising:
(i) obtaining image data corresponding to the image to be recorded on the unit region;
(ii) obtaining a plurality of contribution ratios corresponding to the plurality of recording element groups, wherein each of the plurality of contribution ratios is a use ratio of the respective plurality of recording element groups for recoding the image on the unit region;
(iii) obtaining a plurality of correcting values corresponding to the plurality of recording element groups, wherein each of the plurality of correcting values is a value for correcting the image data with regard to a characteristic of a recording agent ejection amount in the respective plurality of recording element groups; and
(iv) correcting the image data in accordance with the plurality of contribution ratios and the plurality of correcting values.

16. A recording apparatus for recording an image on a unit region of a recording medium by performing a plurality of relative scanning operations of the recording medium and a recording head including a plurality of recording elements, with ejecting a recording agent by each of a plurality of recording element groups formed by one or more recording elements, the recording apparatus comprising:
a processor which executes the following steps of
(i) obtaining image data corresponding to the image to be recorded on the unit region;
(ii) obtaining a plurality of contribution ratios corresponding to the plurality of recording element groups, wherein each of the plurality of contribution ratios is a use ratio of the respective plurality of recording element groups for recoding the image on the unit region;
(iii) obtaining a plurality of correcting values corresponding to the plurality of recording element groups, wherein each of the plurality of correcting values is a value for correcting the image data with regard to a characteristic of a recording agent ejection amount in the respective plurality of recording element groups; and
(iv) correcting the image data in accordance with the plurality of contribution ratios and the plurality of correcting values; and
a controller which executes recording the image on the recording medium in accordance with the corrected image data by using the recording head.

* * * * *